United States Patent
Wang et al.

(10) Patent No.: US 8,902,734 B2
(45) Date of Patent: Dec. 2, 2014

(54) SYSTEM AND METHOD FOR PROVIDING COMMUNICATION CONNECTION RESILIENCE

(75) Inventors: Dawei Wang, Mountain View, CA (US); V. S. Jagannadham (Jack) Jonnalagadda, Menlo Park, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 958 days.

(21) Appl. No.: 13/018,117

(22) Filed: Jan. 31, 2011

(65) Prior Publication Data

US 2012/0195189 A1    Aug. 2, 2012

(51) Int. Cl.
G01R 31/08    (2006.01)
H04W 24/04    (2009.01)
H04L 12/24    (2006.01)

(52) U.S. Cl.
CPC ........... *H04W 24/04* (2013.01); *H04L 41/0663* (2013.01)
USPC ............................................... 370/225

(58) Field of Classification Search
USPC .......... 370/216–228, 217–227; 709/238–239, 709/243–244
See application file for complete search history.

(56) References Cited

U.S. PATENT DOCUMENTS

| 7,227,863 | B1 * | 6/2007 | Leung et al. ................... 370/390 |
| 7,362,742 | B1 * | 4/2008 | Siddiqi et al. ................. 370/350 |
| 7,724,651 | B2 * | 5/2010 | Washam et al. ............... 370/217 |
| 7,859,992 | B2 * | 12/2010 | Buchko et al. ................ 370/217 |
| 2003/0026202 | A1 * | 2/2003 | Aschermann ................ 370/216 |
| 2003/0048746 | A1 * | 3/2003 | Guess et al. .................. 370/221 |
| 2006/0227767 | A1 | 10/2006 | Johnson et al. |
| 2007/0116019 | A1 * | 5/2007 | Cheever et al. ............... 370/401 |
| 2008/0020759 | A1 * | 1/2008 | Nagarajan et al. ............ 455/433 |
| 2008/0101218 | A1 * | 5/2008 | Lei ................................ 370/219 |
| 2008/0101314 | A1 * | 5/2008 | Bachmutsky ................. 370/342 |
| 2008/0181233 | A1 * | 7/2008 | Washam et al. ............ 370/395.5 |
| 2008/0194244 | A1 * | 8/2008 | Chen et al. .................... 455/418 |
| 2008/0228943 | A1 * | 9/2008 | Balus et al. ................... 709/239 |
| 2009/0046655 | A1 * | 2/2009 | Zhao et al. .................... 370/331 |
| 2012/0033678 | A1 * | 2/2012 | Page et al. .................... 370/401 |
| 2014/0160919 | A1 * | 6/2014 | Kar et al. ...................... 370/220 |

* cited by examiner

*Primary Examiner* — Jeffrey M Rutkowski

(57) ABSTRACT

A system and method for providing communication connection resilience between a mobile subscriber device and a network, such as the Internet. In one aspect, the invention provides improved communication connection resilience by using multiple nodes in multiple chassis to create redundant communication routes and to provide redundancy for control data relating to a mobile subscriber device. In one embodiment, a first node resides in a first chassis and a second node resides in a second chassis, and when an active communication link between the mobile subscriber device and the network via the first node becomes disrupted, the active communication link is rerouted such that data is communicated between the mobile subscriber device and the network via both of the first and second nodes.

15 Claims, 7 Drawing Sheets

SYSTEM AND METHOD FOR PROVIDING COMMUNICATION CONNECTION RESILIENCE

TECHNICAL FIELD

The present invention relates to wireless communication systems, and more particularly, to a system and a method for providing communication connection resilience between a mobile subscriber device and a network.

BACKGROUND

Network connectivity resilience is important for users of mobile subscriber devices. In some conventional systems, network connectivity resilience is provided by simple redundancy in a single node, residing in a single chassis, i.e., intra-chassis resilience.

In other conventional systems, network connectivity resilience may be provided by dual-node redundancy, in which one node acts as an active node and the other node acts as a "hot" standby node. In these systems, when the active node fails, the active communication connection is rerouted through the standby node, and the standby node performs all of the functions of the active node.

However, these conventional systems rely on a single chassis for both subscriber traffic and control information, even in the scenario in which the active node fails and the backup node becomes active. In addition, conventional systems generally do not have a protocol for conveying subscriber control data or state information to an external node. Hence, there is a need for a system and a method for providing communication connection resilience between a mobile device and a network, in order to provide additional connection robustness and stability, without significantly adding to operational costs.

SUMMARY

Particular embodiments of the disclosed solution provide a system and method for using a first node and a second node to provide communication connection resilience between a mobile subscriber device and a network such as the Internet. The first node resides in a first chassis and the second node resides in a second chassis. When an active communication link between the mobile subscriber device and the network via the first node becomes disrupted, the active communication link is rerouted such that data is communicated between the mobile subscriber device and the network via both of the first and second nodes.

In one aspect, particular embodiments of the disclosed solution provide a system for providing communication connection resilience between a mobile subscriber device and a network, such as, for example, the Internet. The system comprises a first node residing in a first chassis and a second node residing in a second chassis. The first node is in communication with the mobile subscriber device, and configured to provide an active communication link between the mobile subscriber device and the network. The second node is in communication with the mobile subscriber device and with the first node, and configured to provide a non-active communication link to the network. The first node includes a first transceiver, a first processor, and a first database. The first database is configured to store control information relating to the mobile subscriber device. The first processor is configured to update the control information. The second node includes a second transceiver, a second processor, and a second database. The second database is configured to store the control information relating to the mobile subscriber device. When the control information relating to the mobile subscriber device is updated by the first processor, the first transceiver transmits the updated control information to the second transceiver. When the active communication link between the mobile subscriber device and the network via the first node is disrupted, the first processor reroutes the active communication link between the mobile subscriber device and the network to include both of the first node and the second node.

In another aspect of particular embodiments of the disclosed solution, when the active communication link is disrupted between the mobile subscriber device and the first node, the first processor may reroute the active communication link such that first traffic is transmitted from the mobile subscriber device to the second transceiver, then from the second transceiver to the first transceiver, then from the first transceiver to the network, and such that second traffic is transmitted from the network to the first transceiver, then from the first transceiver to the second transceiver, then from the second transceiver to the mobile subscriber device.

In yet another aspect of particular embodiments of the disclosed solution, when the active communication link is disrupted between the first node and the network, the first processor may reroute the active communication link such that first traffic is transmitted from the mobile subscriber device to the first transceiver, then from the first transceiver to the second transceiver, then from the second transceiver to the network, and such that second traffic is transmitted from the network to the second transceiver, then from the second transceiver to the first transceiver, then from the first transceiver to the mobile subscriber device.

In some embodiments, the second processor may be configured to update control information relating to the mobile subscriber device. When the control information relating to the mobile subscriber device is updated by the second processor, the second transceiver may be further configured to transmit the updated control information to the first transceiver.

In some embodiments, a communication link between the first node and the second node may include a link aggregation group. The link aggregation group may include at least two communication paths.

In another aspect, particular embodiments of the disclosed solution provide a method for using a first node and a second node to provide communication connection resilience between a mobile subscriber device and a network, such as, for example, the Internet. The first node resides in a first chassis and the second node resides in a second chassis. The first node is in communication with the mobile subscriber device and with the network and with the second node, and includes a first transceiver and a first database configured to store control information relating to the mobile subscriber device and a first processor configured to update the control information. The second node is in communication with the network and includes a second transceiver and a second processor and a second database configured to store the control information relating to the mobile subscriber device. The first node conducts an active communication link between the mobile subscriber device and the network. When the active communication link between the mobile subscriber device and the network via the first node becomes disrupted, the first processor reroutes the active communication link with the mobile subscriber device such that data is communicated between the mobile subscriber device and the network via both of the first and second nodes.

In another aspect of particular embodiments of the disclosed solution, when the active communication link is disrupted between the mobile subscriber device and the first node, the first processor may reroute the active communication link such that first traffic is transmitted from the mobile subscriber device to the second transceiver, then from the second transceiver to the first transceiver, then from the first transceiver to the network, and such that second traffic is transmitted from the network to the first transceiver, then from the first transceiver to the second transceiver, then from the second transceiver to the mobile subscriber device.

In yet another aspect of particular embodiments of the disclosed solution, when the active communication link is disrupted between the first node and the network, the first processor may reroute the active communication link such that first traffic is transmitted from the mobile subscriber device to the first transceiver, then from the first transceiver to the second transceiver, then from the second transceiver to the network, and such that second traffic is transmitted from the network to the second transceiver, then from the second transceiver to the first transceiver, then from the first transceiver to the mobile subscriber device.

In some embodiments, the second processor may be configured to update control information relating to the mobile subscriber device. When the control information relating to the mobile subscriber device is updated by the second processor, the second transceiver may transmit the updated control information to the first transceiver.

In some embodiments, a communication link between the first node and the second node may include a link aggregation group. The link aggregation group may include at least two communication paths.

In yet another aspect, particular embodiments of the disclosed solution provide a non-transitory storage medium for storing computer software. The storage medium resides in a first chassis. The software includes instructions for causing a computer to use a first node residing in the first chassis and a second node residing in a second chassis to provide communication connection resilience between a mobile subscriber device and a network, such as, for example, the Internet. The first node is in communication with the mobile subscriber device and with the network and with the second node and includes a first transceiver and a first database configured to store control information relating to the mobile subscriber device and a first processor configured to update the control information. The second node is in communication with the network and including a second transceiver and a second processor and a second database configured to store the control information relating to the mobile subscriber device. The software further includes instructions for causing a computer to: provide an active communication link between the mobile subscriber device and the network via the first node; when the active communication link between the mobile subscriber device and the network becomes disrupted, cause the first processor to reroute the active communication link with the mobile subscriber device such that data is communicated between the mobile subscriber device and the network via both of the first and second nodes.

In another aspect of particular embodiments of the disclosed solution, when the active communication link is disrupted between the mobile subscriber device and the first node, the software may further include instructions for causing a computer to cause the first processor to reroute the active communication link such that first traffic is transmitted from the mobile subscriber device to the second transceiver, then from the second transceiver to the first transceiver, then from the first transceiver to the network, and such that second traffic is transmitted from the network to the first transceiver, then from the first transceiver to the second transceiver, then from the second transceiver to the mobile subscriber device.

In yet another aspect of particular embodiments of the disclosed solution, when the active communication link is disrupted between the first node and the network, the software may further include instructions for causing a computer to cause the first processor to reroute the active communication link such that first traffic is transmitted from the mobile subscriber device to the first transceiver, then from the first transceiver to the second transceiver, then from the second transceiver to the network, and such that second traffic is transmitted from the network to the second transceiver, then from the second transceiver to the first transceiver, then from the first transceiver to the mobile subscriber device.

In some embodiments, the second processor may be configured to update control information relating to the mobile subscriber device. When the control information relating to the mobile subscriber device is updated by the second processor, the software may further include instructions for causing a computer to cause the second node to transmit the updated control information to the first node.

In some embodiments, a communication link between the first node and the second node may include a link aggregation group. The link aggregation group may include at least two communication paths.

In still another aspect, particular embodiments of the disclosed solution provide a mobile subscriber device configured to communicate with a network, such as, for example, the Internet, via a first node. The mobile subscriber device is configurable to communicate with the network via a second node. The first node is in communication with the second node, and the first node is configured to store and update control information relating to the mobile subscriber device. When an active communication link between the mobile subscriber device and the network is disrupted, the mobile subscriber device communicates with the network via both of the first and second nodes.

BRIEF DESCRIPTION OF THE DRAWINGS

The accompanying drawings, which are incorporated herein and form part of the specification, illustrate various embodiments of the solution disclosed herein and, together with the description, further serve to explain the principles of the disclosed solution and to enable a person skilled in the pertinent art to make and use the disclosed solution. In the drawings, like reference numbers indicate identical or functionally similar elements.

DETAILED DESCRIPTION

Figure 1:
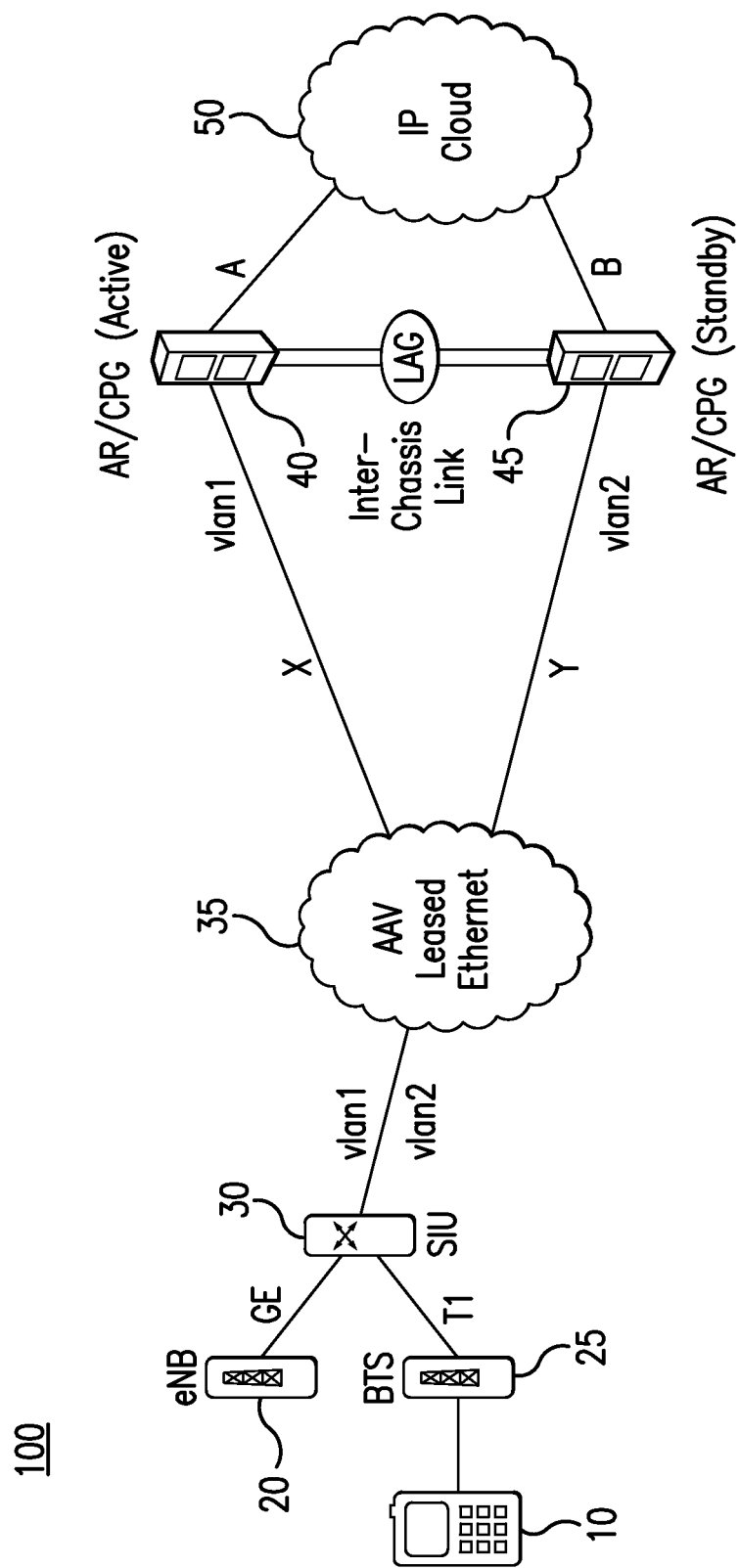
FIG. 1 illustrates a multi-chassis connection diagram for a mobile subscriber device in communication with a network in a wireless communication system, according to particular embodiments.

Referring now to FIG. 1, a multi-chassis connection diagram 100 for a mobile subscriber device in communication with a network according to particular embodiments is illustrated. A mobile subscriber device 10 wirelessly communicates with a base transceiver station (BTS) 25, which communicates with a site integration unit (SIU) 30 over a T1 connection. An extended node B (eNB) 20 also communicates with BTS 25 over a gigabit Ethernet (GE) connection. The SIU 30 provides bidirectional forwarding detection (BFD) for any active communication link.

The SIU 30 communicates with network 50, e.g., the Internet, via an alternate access vendor (AAV) Ethernet connection 35 and two separate nodes—node A 40, which resides in a first chassis and acts as an active node; and node B 45, which resides in a second chassis and acts as a backup node. The AAV 35 maintains two separate physical connections, connection X with node A 40 and connection Y with node B 45.

In an exemplary embodiment, node A 40 and node B 45 are in communication with each other via a link aggregation group (LAG). The LAG typically includes at least two independent communication paths, thereby providing redundancy and reducing the probability of a communication disruption between the nodes. In some embodiments, node A 40 and node B 45 are in communication with each other via an Equal Cost Multi-Path (ECMP) pseudowire connection. In other embodiments, node A 40 and node B 45 are in communication with each other via other resilient communication means. The two chassis for node A 40 and node B 45 may be co-located, thereby enabling the use of wired connectivity within the LAG.

Because node A 40 is the active node, node A 40 updates and maintains a database that stores control data, also referred to as state information, for the mobile subscriber device 10. The control data includes information relating to whether the mobile subscriber device 10 is active or idle. The control data also includes information relating to available functionalities of the mobile subscriber device 10. In addition, backup node B 45 maintains a copy of the control data for mobile subscriber device 10 in its own database. However, in the backup role, node B 45 does not modify or update this control data independently; instead, the node B 45 database receives updated information from node A 40 via the LAG in a read-only mode.

The connection diagram 100 thus provides two additional communication paths between network 50 and SIU 30, both of which use both node A 40 and node B 45. One additional path proceeds bidirectionally from network 50 to node A 40 to node B 45 via the LAG, and then from node B 45 to AAV 35 along connection Y, and finally to SIU 30. A second additional path proceeds bidirectionally from network 50 to node B 45 to node A 40 via the LAG, and then from node A 40 to AAV 35 along connection X, and finally to SIU 30.

Accordingly, the active node A 40 can communicate with the SIU 30 via one of two routes—either directly via connection X, or indirectly via node B 45 and connection Y. The indirect inter-chassis route that utilizes node B 45 generally has a higher cost, but it provides additional connection resiliency.

The indirect inter-chassis route may be accessed either automatically or manually. For example, an operator can manually program the inter-chassis route. Alternatively, the inter-chassis route can be automated, for example, in an inter-chassis resilience (ICR) daemon that resides as software in a computer processor.

The active node A 40 will advertise the loopback interface owned by the cluster to the external world. Accordingly, downlink traffic is communicated to the active node A 40 via a core-facing physical interface, and uplink traffic is communicated to the active node A 40 via an access-facing interface.

Figure 2A:
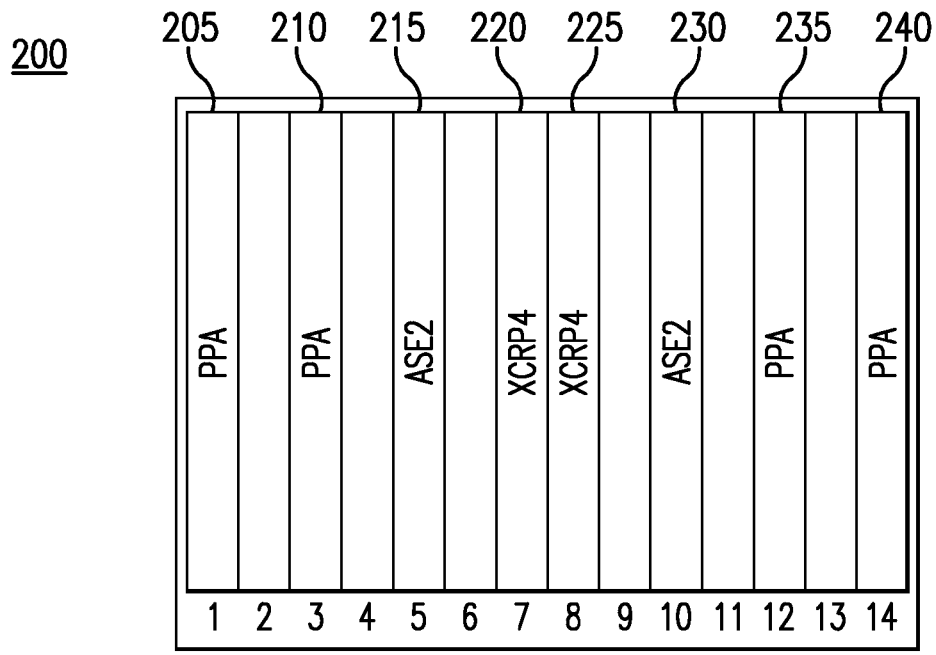
FIG. 2A illustrates a chassis, including a plurality of card slots, that may be utilized as a node in a wireless communication system configured as shown in FIG. 1.

Referring now to FIG. 2A, a chassis 200 for use in an active node or backup node according to a particular embodiment is illustrated. The chassis 200 includes a plurality of card slots. Each of slot 1 205, slot 3 210, slot 12 235, and slot 14 240 houses a PPA card, which is used for traffic processing. Each of slot 5 215 and slot 10 230 houses an ASE2 session controller card. Each of slot 7 220 and slot 8 225 houses an XCRP4 node controller card.

Figure 2B:
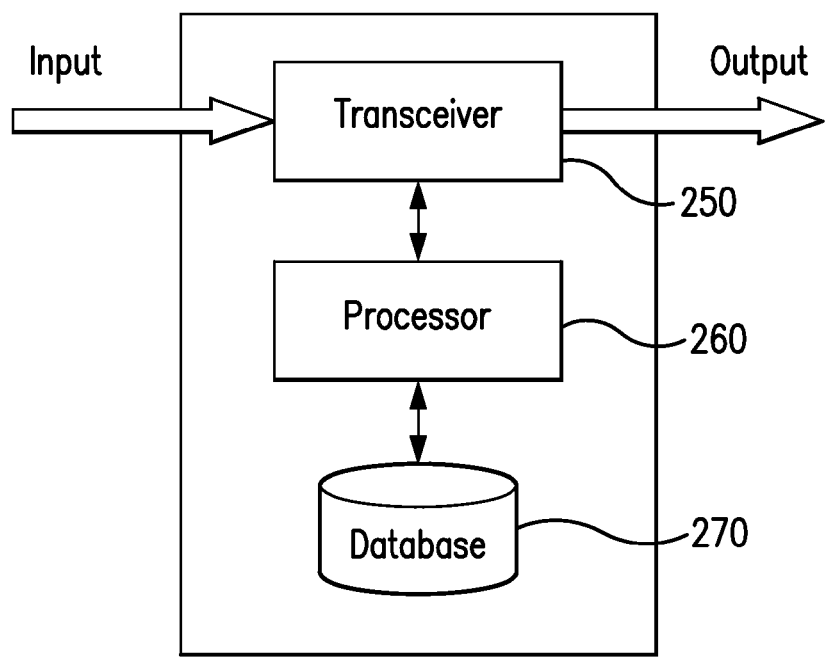
FIG. 2B is a block diagram of a node residing in the chassis of FIG. 2A.

Referring now to FIG. 2B, a block diagram illustrates the functions of the node of chassis 200. The node includes a transceiver 250 which receives inputs and transmits outputs. The node also includes a processor 260 which controls the actions of the node. Notably, the processor 260 may be programmed to execute computer software that includes instructions for performing a method of providing communication resilience in accordance with a particular embodiment. Finally, the node includes a database 270 which stores data, including control data (also referred to as state information) relating to the mobile subscriber device that is involved in the active communication connection.

Figure 3:
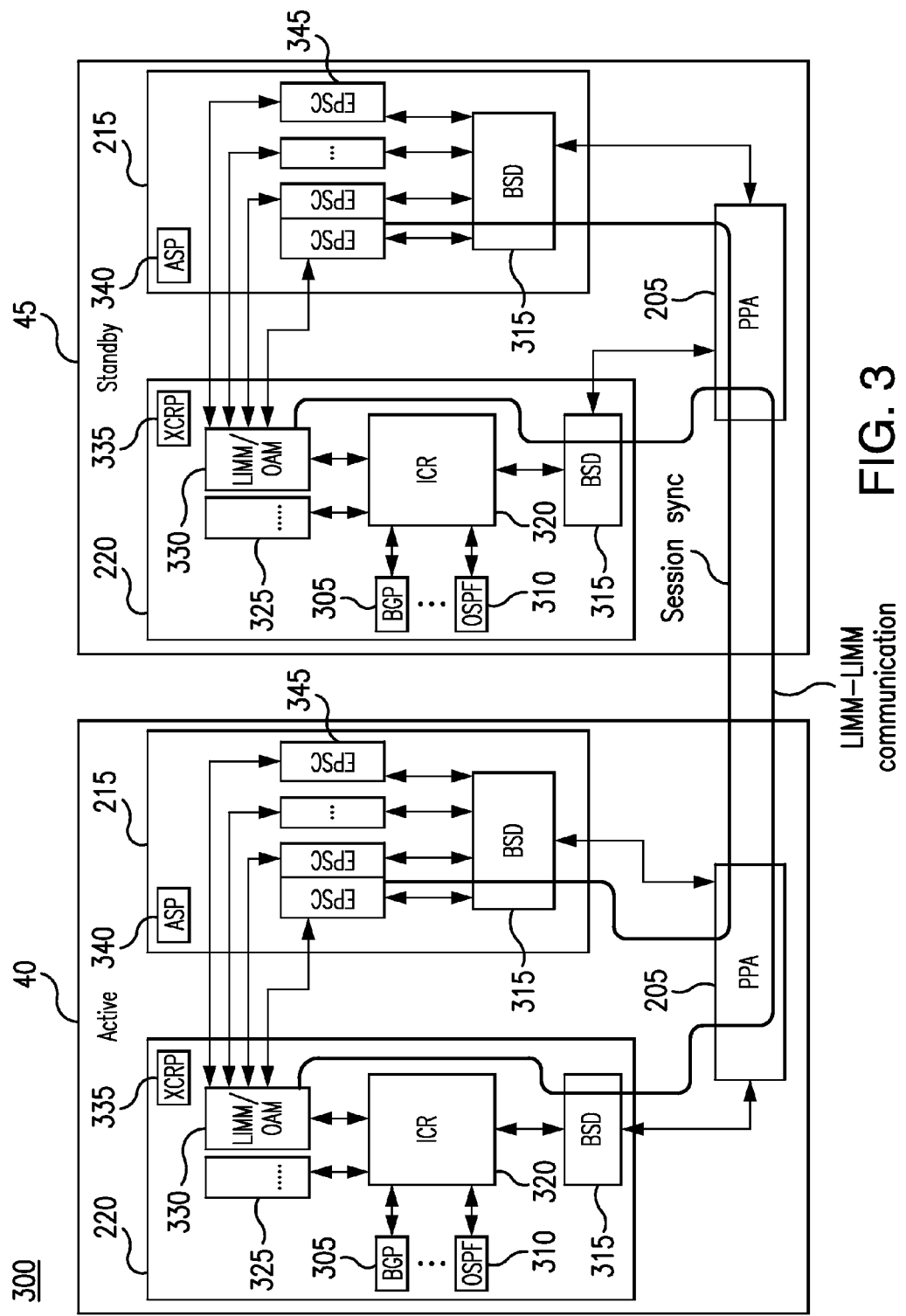
FIG. 3 is a block diagram showing software modules residing in an active node and a standby node that may be utilized in a wireless communication system configured as shown in FIG. 1.

Referring now to FIG. 3, a block diagram 300 showing software modules residing in an active node 40 and a standby node 45 according to a particular embodiment is illustrated. Each node includes a traffic processing module 205 (labeled "PPA" herein), which processes traffic and forwards data. Each node also includes a session controller card 215 (labeled "ASE2" herein), which includes a processor module 340 (labeled "ASP" herein), an operating system module 315 (labeled "BSD" herein), and several application modules 345 (labeled "EPSC" herein). The BSD module 315 implements the operating system of the processor. Each of the EPSC modules 345 implements application daemon software.

Each node also includes a node controller card 220 (labeled "XCRP4" herein). The XCRP4 card 220 includes a Border Gateway Protocol module 305 (labeled "BGP" herein); an Open Shortest Path First module 310 (labeled "OSPF" herein); an inter-chassis resilience module 320 (labeled "ICR" herein); a module 325; an operations, administration, and maintenance module 330 (labeled "LIMM/OAM" herein), and a node control functions module 335 (labeled "XCRP" herein). The BGP module 305 and the OSPF module 310 implement routing decisions and routing protocols in accordance with particular embodiments described herein. The ICR module 320 implements software to provide an inter-chassis resilience solution in accordance with particular embodiments described herein. The LIMM/OAM module 330 implements operations, administration, and maintenance for the node. The XCRP module 335 implements node control functions.

Figure 4:
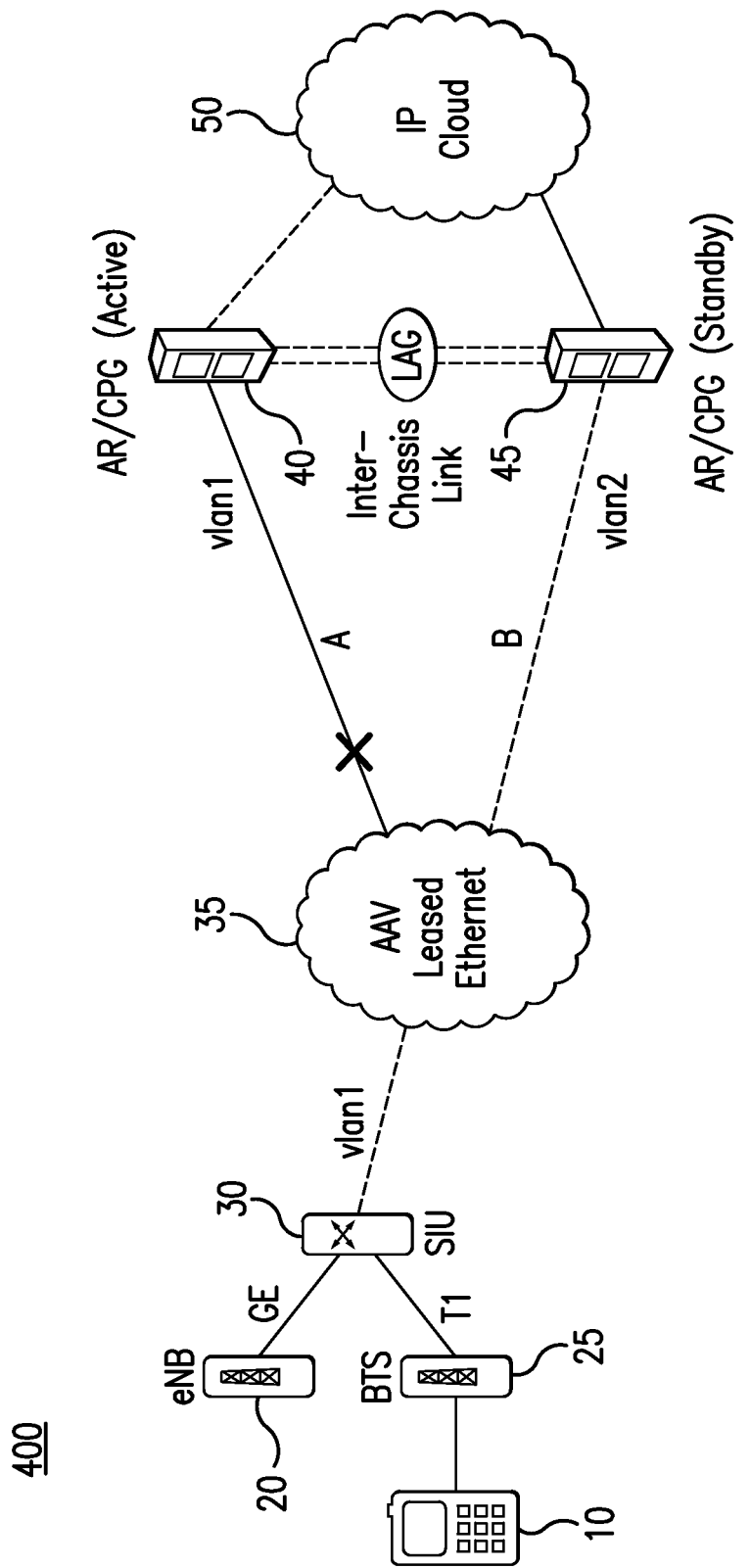
FIG. 4 illustrates the multi-chassis connection diagram of FIG. 1 in a scenario in which an active communication link between a mobile subscriber device and an active node has been disrupted.

Referring now to FIG. 4, a multi-chassis connection diagram according to a particular embodiment is illustrated for a scenario 400 in which an active communication link between the AAV and the active node A 40 has been disrupted. In this scenario, the bidirectional forwarding detection (BFD) of SIU 30 detects the link failure, and then alerts standby node B 45 that node B 45 will now become an active node. Then, the processor 260 in node A 40 causes the active communication connection to be rerouted to traverse both of node A 40 and node B 45, as indicated by the dotted path from SIU 30 to AAV 35 to node B 45 to node A 40 via the LAG and finally to the network 50. Accordingly, downlink traffic is communicated from the network 50 through node A 40, then to node B 45 via the LAG, then to AAV 35 and SIU 30, and finally to BTS 25 and mobile subscriber device 10. Uplink traffic is communicated from mobile subscriber device 10 to BTS 25 to SIU 30 to AAV 35, then to node B 45 and then to node A 40 via the LAG, and finally to the network 50. Node A 40 continues to update the control data for mobile subscriber device 10, and Node B 45 continues to maintain a read-only copy of the updated control data, as transmitted from Node A 40.

Figure 5:
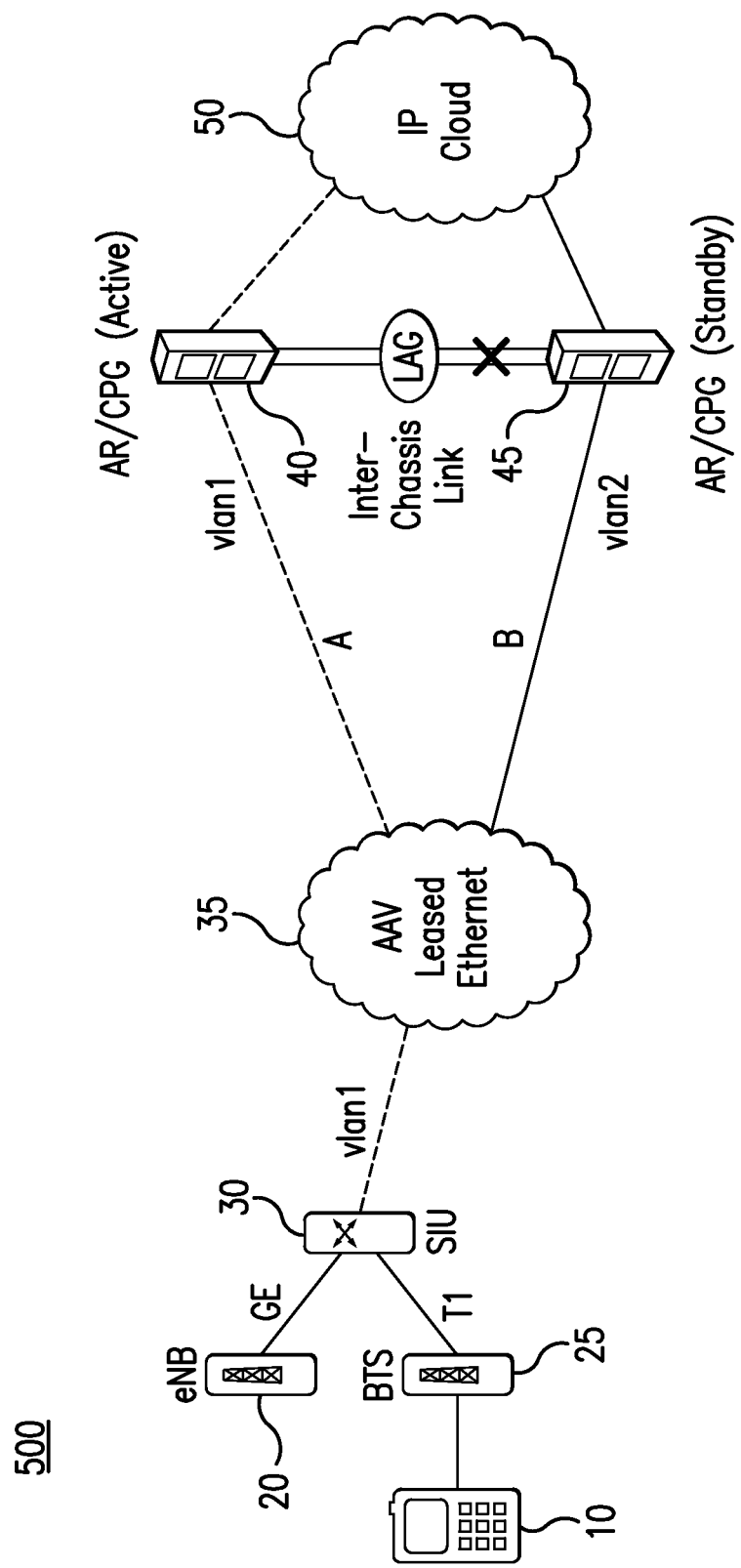
FIG. 5 illustrates the multi-chassis connection diagram of FIG. 1 in a scenario in which a communication link between an active node and a standby node has been disrupted.

Referring now to FIG. 5, a multi-chassis connection diagram according to a particular embodiment is illustrated for a scenario 500 in which the inter-chassis link between node A 40 and node B 45 has been disrupted. This scenario is expected to be rare, because the inter-chassis link between node A 40 and node B 45 is LAG protected, i.e., this link includes built-in redundancy. However, in the event that the inter-chassis link becomes disabled, the system will temporarily lack the use of the backup node for any redundancy. Despite the lack of redundancy, the active communication connection between the mobile subscriber device 10 and the network 50 will generally continue along the direct single-chassis path also illustrated in FIG. 1.

Figure 6:
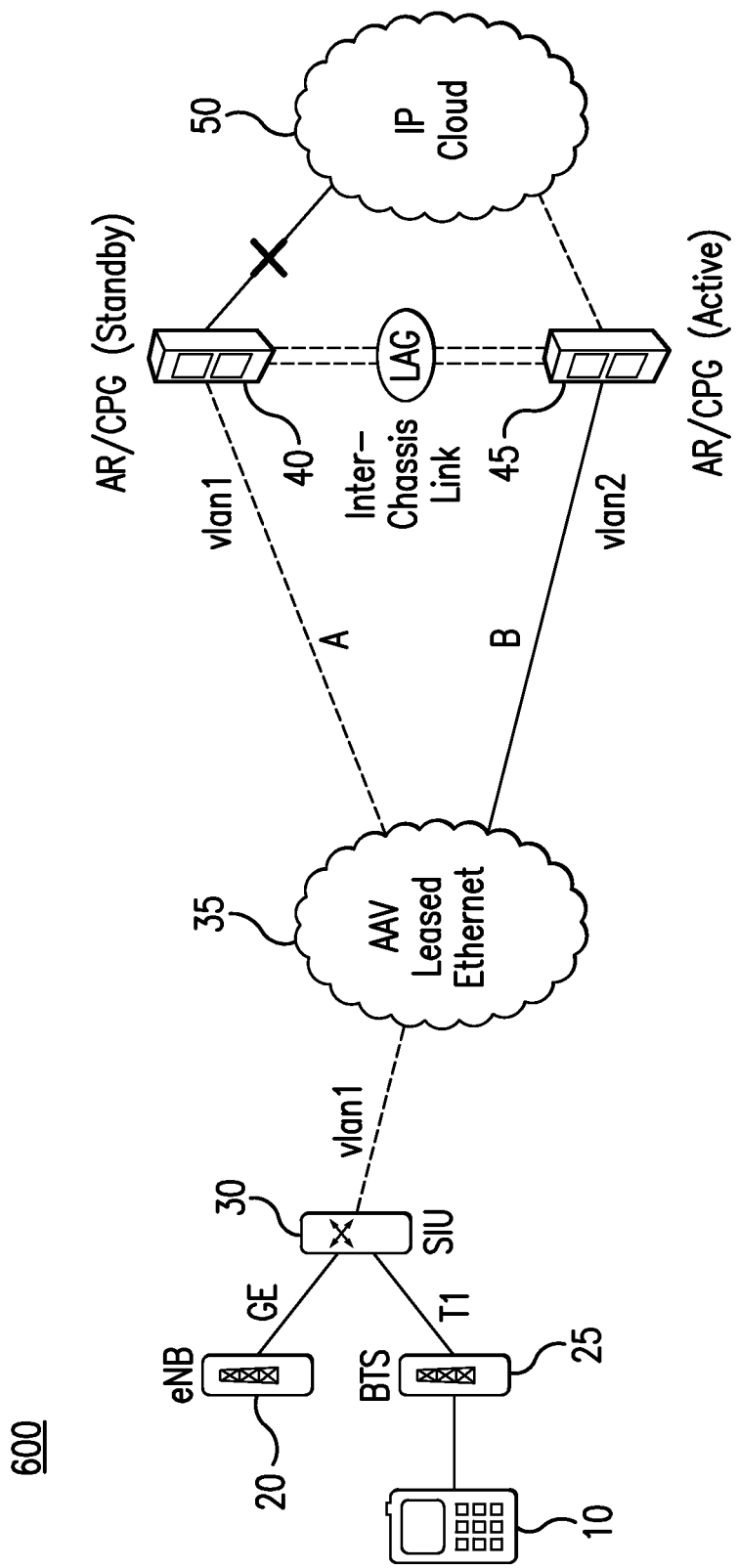
FIG. 6 illustrates the multi-chassis connection diagram of FIG. 1 in a scenario in which an active communication link between an active node and a network has been disrupted.

Referring now to FIG. 6, a multi-chassis connection diagram according to a particular embodiment is illustrated for a scenario 600 in which an active communication link between the network 50 and the active node A 40 has been disrupted. In this scenario, the bidirectional forwarding detection (BFD) of SIU 30 detects the link failure, and then alerts standby node B 45 that node B 45 will now become an active node. Then, the processor 260 in node A 40 causes the active communication connection to be rerouted to traverse both of node A 40 and node B 45, as indicated by the dotted path from SIU 30 to AAV 35 to node A 40 to node B 45 via the LAG and finally to the network 50. Accordingly, downlink traffic is communicated from the network 50 through node B 45, then to node A 40 via the LAG, then to AAV 35 and SIU 30, and finally to BTS 25 and mobile subscriber device 10. Uplink traffic is communicated from mobile subscriber device 10 to BTS 25 to SIU 30 to AAV 35, then to node A 40 and then to node B 45 via the LAG, and finally to the network 50. In addition, Node B 45 becomes the "active" node and Node A 40 becomes the "standby" node. In this aspect, node B 45 assumes the responsibility for updating the control data for mobile subscriber device 10, and Node A 40 maintains a read-only copy of the updated control data, as transmitted from Node B 45.

Figure 7:
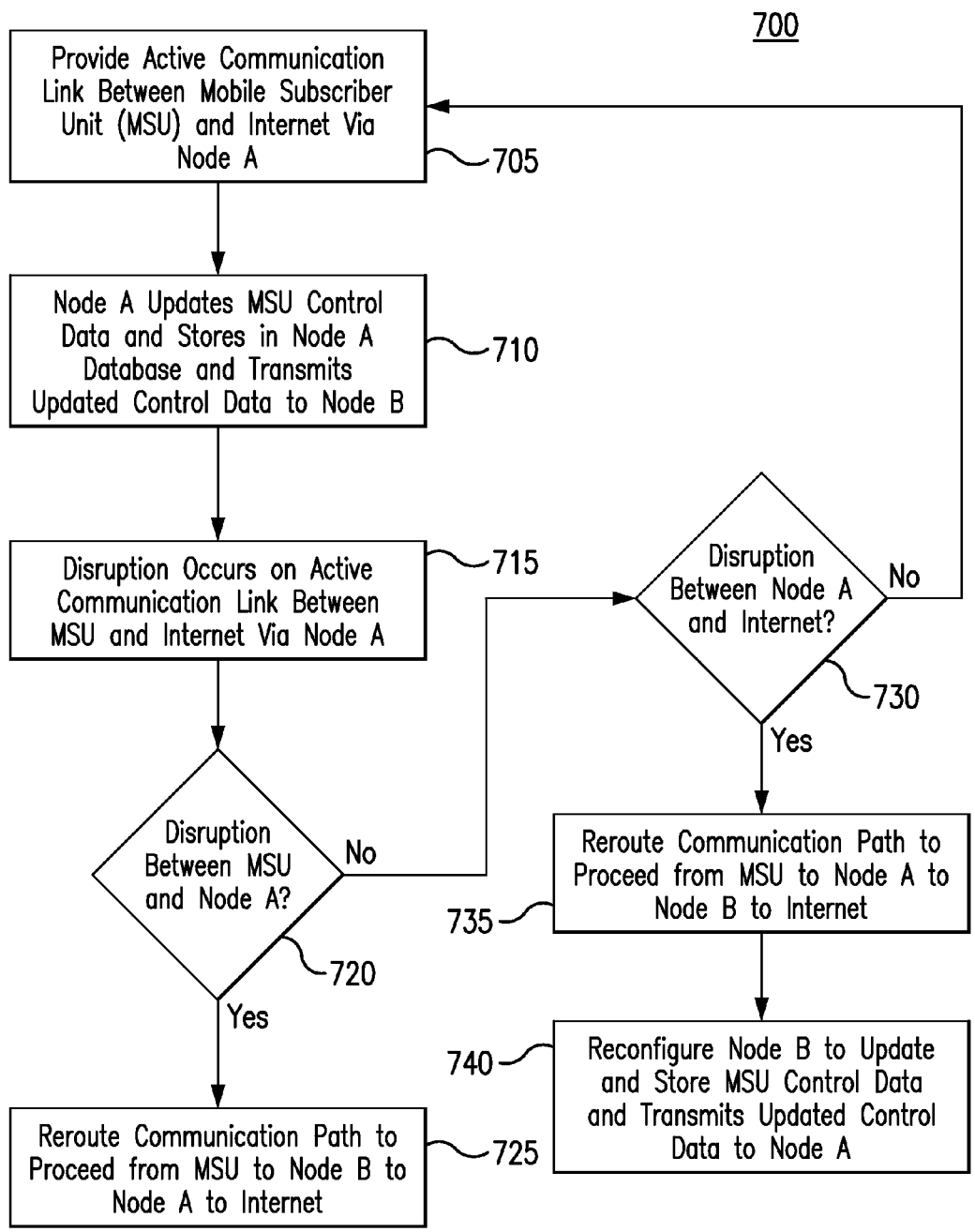
FIG. 7 is a flow chart illustrating a method of providing communication connection resilience between a mobile subscriber device and a network according to particular embodiments.

Referring now to FIG. 7, a flow chart 700 illustrates the steps of a method of providing communication connection resilience between a mobile subscriber device and a network according to particular embodiments. In the first step 705, an active communication link is provided between a mobile subscriber unit and a network, e.g., the Internet, via an active node A. In the second step 710, node A maintains control data relating to the mobile subscriber unit, and transmits updates of the control data to a backup node B for storage as a backup. Then, in step 715, a disruption occurs along the path of the active communication link.

At step 720, a determination is made as to whether the disruption occurred on the link between the mobile subscriber unit and node A. If it is determined that the disruption did indeed occur between the mobile subscriber unit and node A, then at step 725, the active communication link is rerouted to proceed bidirectionally from the mobile subscriber unit to backup node B, and then from node B to node A, and finally from node A to the Internet.

If it is determined that there was no disruption between the mobile subscriber unit and node A, then the method proceeds to step 730. At step 730, a determination is made as to whether the disruption occurred on the link between node A and the Internet. If it is determined that the disruption did indeed occur between node A and the Internet, then at step 735, the active communication link is rerouted to proceed bidirectionally from the mobile subscriber unit to node A, then from node A to node B, and finally from node B to the Internet. Then, at step 740, node B is reconfigured to act as the active node, and node A is reconfigured to act as the backup node. In this regard, node B is reconfigured to update and store the control data relating to the mobile subscriber unit, and also to transmit the updated control data to node A, which will store the control data in a backup database.

If, at step 730, it is determined that there is no disruption between node A and the Internet, then the method proceeds back to step 705, at which the active communication link is provided directly from the mobile subscriber unit to the Internet via node A.

While various embodiments have been described above, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

What is claimed is:

1. A system for providing communication connection resilience between a mobile subscriber device and a network, the system comprising:

a first node residing in a first chassis, the first node in communication with the mobile subscriber device, and configured to provide an active communication link between the mobile subscriber device and the network; and a second node residing in a second chassis, the second node in communication with the mobile subscriber device and with the first node, and configured to provide a non-active communication link to the network;

the first node including a first transceiver, a first processor, and a first database, the first database configured to store control information relating to the mobile subscriber device, and the first processor configured to update the control information;

the second node including a second transceiver, a second processor, and a second database, the second database configured to store the control information relating to the mobile subscriber device;

wherein, when the control information relating to the mobile subscriber device is updated by the first processor, the first transceiver transmits the updated control information to the second transceiver; and wherein when the active communication link between the mobile subscriber device and the network via the first node is disrupted, the first processor reroutes the active communication link between the mobile subscriber device and the network to include both of the first node and the second node, wherein when the active communication link is disrupted between the mobile subscriber device and the first node, the first processor reroutes the active communication link such that first traffic is transmitted from the mobile subscriber device to the second transceiver, then from the second transceiver to the first transceiver, then from the first transceiver to the network, and such that second traffic is transmitted from the network to the first transceiver, then from the first transceiver to the second transceiver, then from the second transceiver to the mobile subscriber device.

2. The system of claim 1, wherein the network comprises the Internet.

3. A system for providing communication connection resilience between a mobile subscriber device and a network, the system comprising:
- a first node residing in a first chassis, the first node in communication with the mobile subscriber device, and configured to provide an active communication link between the mobile subscriber device and the network; and
- a second node residing in a second chassis, the second node in communication with the mobile subscriber device and with the first node, and configured to provide a non-active communication link to the network;
- the first node including a first transceiver, a first processor, and a first database, the first database configured to store control information relating to the mobile subscriber device, and the first processor configured to update the control information;
- the second node including a second transceiver, a second processor, and a second database, the second database configured to store the control information relating to the mobile subscriber device;
- wherein, when the control information relating to the mobile subscriber device is updated by the first processor, the first transceiver transmits the updated control information to the second transceiver; and
- wherein when the active communication link between the mobile subscriber device and the network via the first node is disrupted, the first processor reroutes the active communication link between the mobile subscriber device and the network to include both of the first node and the second node, wherein when the active communication link is disrupted between the first node and the network, the first processor reroutes the active communication link such that first traffic is transmitted from the mobile subscriber device to the first transceiver, then from the first transceiver to the second transceiver, then from the second transceiver to the network, and such that second traffic is transmitted from the network to the second transceiver, then from the second transceiver to the first transceiver, then from the first transceiver to the mobile subscriber device;
- wherein the second processor is configured to update control information relating to the mobile subscriber device; and
- wherein when the control information relating to the mobile subscriber device is updated by the second processor, the second transceiver is further configured to transmit the updated control information to the first transceiver.

4. A method for using a first node and a second node to provide communication connection resilience between a mobile subscriber device and a network, the first node residing in a first chassis and the second node residing in a second chassis, the first node in communication with the mobile subscriber device and with the network and with the second node and including a first transceiver and a first database configured to store control information relating to the mobile subscriber device and a first processor configured to update the control information, the second node in communication with the network and including a second transceiver and a second processor and a second database configured to store the control information relating to the mobile subscriber device, and the method comprising:
- the first node conducting an active communication link between the mobile subscriber device and the network;
- when the active communication link between the mobile subscriber device and the network via the first node becomes disrupted, the first processor rerouting the active communication link with the mobile subscriber device such that data is communicated between the mobile subscriber device and the network via both of the first and second nodes, wherein when the active communication link is disrupted between the mobile subscriber device and the first node, the first processor rerouting the active communication link further includes the first processor rerouting the active communication link such that first traffic is transmitted from the mobile subscriber device to the second transceiver, then from the second transceiver to the first transceiver, then from the first transceiver to the network, and such that second traffic is transmitted from the network to the first transceiver, then from the first transceiver to the second transceiver, then from the second transceiver to the mobile subscriber device.

5. The method of claim 4, wherein the network comprises the Internet.

6. A method for using a first node and a second node to provide communication connection resilience between a mobile subscriber device and a network, the first node residing in a first chassis and the second node residing in a second chassis, the first node in communication with the mobile subscriber device and with the network and with the second node and including a first transceiver and a first database configured to store control information relating to the mobile subscriber device and a first processor configured to update the control information, the second node in communication with the network and including a second transceiver and a second processor and a second database configured to store the control information relating to the mobile subscriber device, and the method comprising:
- the first node conducting an active communication link between the mobile subscriber device and the network;
- when the active communication link between the mobile subscriber device and the network via the first node becomes disrupted, the first processor rerouting the active communication link with the mobile subscriber device such that data is communicated between the mobile subscriber device and the network via both of the first and second nodes, wherein when the active communication link is disrupted between the first node and the network, the first processor rerouting the active communication link further includes the first node rerouting the active communication link such that first traffic is transmitted from the mobile subscriber device to the first transceiver, then from the first transceiver to the second transceiver, then from the second transceiver to the network, and such that second traffic is transmitted from the network to the second transceiver, then from the second transceiver to the first transceiver, then from the first transceiver to the mobile subscriber device, wherein the second processor is configured to update control information relating to the mobile subscriber device; and wherein when the control information relating to the mobile subscriber device is updated by the second processor, the method further comprises the second transceiver transmitting the updated control information to the first transceiver.

7. A non-transitory storage medium for storing computer software, the storage medium residing in a first chassis, the software including instructions for causing a computer to use a first node residing in the first chassis and a second node residing in a second chassis to provide communication connection resilience between a mobile subscriber device and a network, the first node in communication with the mobile subscriber device and with the network and with the second node and including a first transceiver and a first database configured to store control information relating to the mobile subscriber device and a first processor configured to update the control information, the second node in communication with the network and including a second transceiver and a second processor and a second database configured to store the control information relating to the mobile subscriber device, and the software further including instructions for causing the computer to:

provide an active communication link between the mobile subscriber device and the network via the first node;

when the active communication link between the mobile subscriber device and the network becomes disrupted, cause the first processor to reroute the active communication link with the mobile subscriber device such that data is communicated between the mobile subscriber device and the network via both of the first and second nodes, and when the active communication link is disrupted between the mobile subscriber device and the first node, the software further includes instructions for causing the computer to cause the first processor to reroute the active communication link such that first traffic is transmitted from the mobile subscriber device to the second transceiver, then from the second transceiver to the first transceiver, then from the first transceiver to the network, and such that second traffic is transmitted from the network to the first transceiver, then from the first transceiver to the second transceiver, then from the second transceiver to the mobile subscriber device.

8. The storage medium of claim 7, wherein the network comprises the Internet.

9. A non-transitory storage medium for storing computer software, the storage medium residing in a first chassis, the software including instructions for causing a computer to use a first node residing in the first chassis and a second node residing in a second chassis to provide communication connection resilience between a mobile subscriber device and a network, the first node in communication with the mobile subscriber device and with the network and with the second node and including a first transceiver and a first database configured to store control information relating to the mobile subscriber device and a first processor configured to update the control information, the second node in communication with the network and including a second transceiver and a second processor and a second database configured to store the control information relating to the mobile subscriber device, and the software further including instructions for causing the computer to:

provide an active communication link between the mobile subscriber device and the network via the first node;

when the active communication link between the mobile subscriber device and the network becomes disrupted, cause the first processor to reroute the active communication link with the mobile subscriber device such that data is communicated between the mobile subscriber device and the network via both of the first and second nodes, and when the active communication link is disrupted between the first node and the network, the software further includes instructions for causing the computer to cause the first processor to reroute the active communication link such that first traffic is transmitted from the mobile subscriber device to the first transceiver, then from the first transceiver to the second transceiver, then from the second transceiver to the network, and such that second traffic is transmitted from the network to the second transceiver, then from the second transceiver to the first transceiver, then from the first transceiver to the mobile subscriber device;

wherein the second processor is configured to update control information relating to the mobile subscriber device; and wherein when the control information relating to the mobile subscriber device is updated by the second processor, the software further includes instructions for causing a computer to cause the second node to transmit the updated control information to the first node.

10. The storage medium of claim 9, wherein a communication link between the first node and the second node comprises a link aggregation group, the link aggregation group including at least two communication paths.

11. A system for providing communication connection resilience between a mobile subscriber device and a network, the system comprising:

a first node residing in a first chassis, the first node in communication with the mobile subscriber device, and configured to provide an active communication link between the mobile subscriber device and the network; and a second node residing in a second chassis, the second node in communication with the mobile subscriber device and with the first node, and configured to provide a non-active communication link to the network;

the first node including a first transceiver, a first processor, and a first database, the first database configured to store control information relating to the mobile subscriber device, and the first processor configured to update the control information;

the second node including a second transceiver, a second processor, and a second database, the second database configured to store the control information relating to the mobile subscriber device;

wherein, when the control information relating to the mobile subscriber device is updated by the first processor, the first transceiver transmits the updated control information to the second transceiver;

wherein when the active communication link is disrupted between the first node and the network, the first processor reroutes the active communication link such that first traffic is transmitted from the mobile subscriber device to the first transceiver, then from the first transceiver to the second transceiver, then from the second transceiver to the network, and such that second traffic is transmitted from the network to the second transceiver, then from the second transceiver to the first transceiver, then from the first transceiver to the mobile subscriber device;

wherein the second processor is configured to update control information relating to the mobile subscriber device; and, wherein when the control information relating to the mobile subscriber device is updated by the second processor, the second transceiver is further configured to transmit the updated control information to the first transceiver.

12. The system of claim 11, wherein a communication link between the first node and the second node comprises a link aggregation group, the link aggregation group including at least two communication paths.

13. A method for using a first node and a second node to provide communication connection resilience between a mobile subscriber device and a network, the first node residing in a first chassis and the second node residing in a second chassis, the first node in communication with the mobile subscriber device and with the network and with the second node and including a first transceiver and a first database configured to store control information relating to the mobile subscriber device and a first processor configured to update the control information, the second node in communication with the network and including a second transceiver and a second processor and a second database configured to store the control information relating to the mobile subscriber device, and the method comprising:

the first node conducting an active communication link between the mobile subscriber device and the network;

wherein when the active communication link is disrupted between the first node and the network, the first processor rerouting the active communication link such that first traffic is transmitted from the mobile subscriber device to the first transceiver, then from the first transceiver to the second transceiver, then from the second transceiver to the network, and such that second traffic is transmitted from the network to the second transceiver, then from the second transceiver to the first transceiver, then from the first transceiver to the mobile subscriber device;

wherein the second processor is configured to update control information relating to the mobile subscriber device; and, wherein when the control information relating to the mobile subscriber device is updated by the second processor, the method further comprises the second transceiver transmitting the updated control information to the first transceiver.

14. The method of claim 13, wherein a communication link between the first node and the second node comprises a link aggregation group, the link aggregation group including at least two communication paths.

15. A non-transitory storage medium for storing computer software, the storage medium residing in a first chassis, the software including instructions for causing a computer to use a first node residing in the first chassis and a second node residing in a second chassis to provide communication connection resilience between a mobile subscriber device and a network, the first node in communication with the mobile subscriber device and with the network and with the second node and including a first transceiver and a first database configured to store control information relating to the mobile subscriber device and a first processor configured to update the control information, the second node in communication with the network and including a second transceiver and a second processor and a second database configured to store the control information relating to the mobile subscriber device;

and the software further including instructions for causing the computer to:

provide an active communication link between the mobile subscriber device and the network via the first node;

when the active communication link is disrupted between the first node and the network, the software further includes instructions for causing the computer to cause the first processor to reroute the active communication link such that first traffic is transmitted from the mobile subscriber device to the first transceiver, then from the first transceiver to the second transceiver, then from the second transceiver to the network, and such that second traffic is transmitted from the network to the second transceiver, then from the second transceiver to the first transceiver, then from the first transceiver to the mobile subscriber device;

wherein the second processor is configured to update control information relating to the mobile subscriber device; and, wherein when the control information relating to the mobile subscriber device is updated by the second processor, the software further includes instructions for causing a computer to cause the second node to transmit the updated control information to the first node.

* * * * *